United States Patent
Carbone et al.

(10) Patent No.: US 10,623,252 B2
(45) Date of Patent: Apr. 14, 2020

(54) PERFORMING ACTIONS THAT HAVE BEEN DEFINED FOR PROVISIONED INSTANCES

(71) Applicant: International Business Machines Corporation, Armonk, NY (US)

(72) Inventors: Nicholas Carbone, Poughkeepsie, NY (US); John L. Czukkermann, LaGrangeville, NY (US); Michael D. Essenmacher, Danbury, CT (US); Kirsten B. McDonald, Poughkeepsie, NY (US); Gary S. Puchkoff, Poughkeepsie, NY (US); Donald W. Schmidt, Stone Ridge, NY (US); Hiren R. Shah, Highland, NY (US); Brad D. Stilwell, Poughkeepsie, NY (US); Andrew P. Wack, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 609 days.

(21) Appl. No.: 15/377,398

(22) Filed: Dec. 13, 2016

(65) Prior Publication Data
US 2018/0167267 A1    Jun. 14, 2018

(51) Int. Cl.
*H04L 12/24* (2006.01)
*H04L 29/06* (2006.01)
*H04L 29/08* (2006.01)
*G06F 15/177* (2006.01)

(52) U.S. Cl.
CPC ........ *H04L 41/082* (2013.01); *H04L 41/0806* (2013.01); *H04L 41/0893* (2013.01); *H04L 41/20* (2013.01); *H04L 67/10* (2013.01); *H04L 67/42* (2013.01); *G06F 15/177* (2013.01); *H04L 41/0843* (2013.01)

(58) Field of Classification Search
CPC ... H04L 41/082; H04L 41/0893; H04L 67/10; H04L 67/20; H04L 67/42; H04L 41/0806; H04L 41/0843; G06F 15/177
USPC .................................................. 709/222, 220
See application file for complete search history.

(56) References Cited

U.S. PATENT DOCUMENTS

| | | |
|---|---|---|
| 5,446,903 A | 8/1995 | Abraham et al. |
| 5,790,789 A | 8/1998 | Suarez |
| 6,854,016 B1 | 2/2005 | Kraenzel et al. |

(Continued)

OTHER PUBLICATIONS

Buzzetti et al., "Determining Identities for Executing Cloud Processing and Approvers of the Executing," U.S. Appl. No. 15/377,354, filed Dec. 13, 2016.

(Continued)

*Primary Examiner* — Lashonda T Jacobs
(74) *Attorney, Agent, or Firm* — Cantor Colburn LLP; William Kinnaman

(57) ABSTRACT

A method includes provisioning, by a cloud provisioning server, an instance of a software resource or service for an end user. The provisioning is based on a template for the software resource or service. The template includes, at least, attribute data, and the attribute data is structured according to an action schema. The method also includes storing the action schema in association with the provisioned instance. The attribute data and the action schema determine at least one action of the provisioned instance. The method also includes performing the at least one action of the provisioned instance.

14 Claims, 7 Drawing Sheets

(56) References Cited

U.S. PATENT DOCUMENTS

| | | | |
|---|---|---|---|
| 6,880,129 B1 | 4/2005 | Lee et al. | |
| 7,054,924 B1 | 5/2006 | Harvey et al. | |
| 7,200,805 B2* | 4/2007 | Carlson | G06F 17/248 715/237 |
| 7,603,443 B2 | 10/2009 | Fong et al. | |
| 7,673,328 B1 | 3/2010 | Kojima | |
| 8,010,899 B2* | 8/2011 | Choi | G06F 17/2247 715/746 |
| 8,122,063 B2* | 2/2012 | Kraft | G06F 9/4488 707/803 |
| 8,200,715 B1* | 6/2012 | Kraft | G06F 9/4488 707/803 |
| 8,266,616 B1 | 9/2012 | Jacquot et al. | |
| 8,677,318 B2 | 3/2014 | Mohindra et al. | |
| 8,706,776 B1* | 4/2014 | Kraft | G06F 9/4488 707/804 |
| 8,874,755 B1* | 10/2014 | Deklich | G06F 9/5072 709/226 |
| 9,276,942 B2 | 3/2016 | Srinivasan et al. | |
| 9,330,161 B2 | 5/2016 | D'Amato et al. | |
| 2004/0083453 A1* | 4/2004 | Knight | G06F 11/323 717/113 |
| 2005/0271050 A1 | 12/2005 | Akgun | |
| 2007/0157317 A1* | 7/2007 | Venkatachalam | G06F 21/10 726/27 |
| 2008/0189206 A1* | 8/2008 | Choi | G06F 17/2247 705/39 |
| 2008/0301672 A1 | 12/2008 | Rao et al. | |
| 2010/0125612 A1 | 5/2010 | Amradkar et al. | |
| 2011/0320605 A1* | 12/2011 | Kramer | H04L 41/0843 709/226 |
| 2013/0091547 A1 | 4/2013 | Venkatesh et al. | |
| 2013/0185431 A1 | 7/2013 | Venkatesh | |
| 2014/0047319 A1* | 2/2014 | Eberlein | G06F 17/2247 715/234 |
| 2014/0074973 A1 | 3/2014 | Kumar et al. | |
| 2014/0075021 A1 | 3/2014 | Revanuru | |
| 2014/0075565 A1 | 3/2014 | Srinivasan | |
| 2015/0156218 A1 | 6/2015 | Arun et al. | |
| 2015/0278397 A1 | 10/2015 | Hendrickson et al. | |
| 2016/0094483 A1 | 3/2016 | Johnston et al. | |
| 2016/0105393 A1 | 4/2016 | Thakkar et al. | |
| 2016/0132805 A1 | 5/2016 | Delacourt et al. | |
| 2016/0132808 A1* | 5/2016 | To | G06Q 10/06315 705/7.25 |
| 2016/0182525 A1 | 6/2016 | Zhu et al. | |
| 2016/0191411 A1* | 6/2016 | Kim | H04L 47/762 705/39 |
| 2016/0323183 A1 | 11/2016 | Jeuk | |
| 2017/0070500 A1 | 3/2017 | Hockey et al. | |
| 2017/0140405 A1 | 5/2017 | Gottemukkala et al. | |
| 2017/0169339 A1 | 6/2017 | Dalmia et al. | |
| 2017/0171146 A1 | 6/2017 | Sharma | |
| 2017/0180346 A1 | 6/2017 | Suarez et al. | |
| 2017/0220448 A1 | 8/2017 | Topiwala et al. | |
| 2017/0364345 A1 | 12/2017 | Fontoura et al. | |
| 2018/0032399 A1 | 2/2018 | Johnson et al. | |
| 2018/0039494 A1 | 2/2018 | Lander | |
| 2018/0129665 A1 | 5/2018 | Bach | |
| 2018/0137139 A1 | 5/2018 | Bangalore et al. | |
| 2018/0150377 A1 | 5/2018 | Oberle | |
| 2018/0167273 A1* | 6/2018 | Buzzetti | H04L 63/102 |

OTHER PUBLICATIONS

Carbone et al., "Configuring and Naming of Cloud Provisioning Entities," U.S. Appl. No. 15/377,427, filed Dec. 13, 2016.

Carbone et al., "Generating and Managing Names of Instances," U.S. Appl. No. 15/377,410, filed Dec. 13, 2016.

List of IBM Patents or Patent Applications Treated as Related; Date Filed: Dec. 13, 2016, 2 pages.

Bertino et al. "Securing XML documents with Author-X." IEEE Internet Computing, vol. 5, Issue 3, May 2001, p. 21-31.

Gao, "Study on the Expended-Enterprise Information Portal Based on the Role Control Theory", Applied Mechanics and Materials, vols. 40-41, pp. 631-636, 2011. (Abstract only).

* cited by examiner

PERFORMING ACTIONS THAT HAVE BEEN DEFINED FOR PROVISIONED INSTANCES

BACKGROUND

One or more embodiments relate in general to performing actions that have been defined for provisioned instances. More specifically, one or more embodiments relate to performing actions that have been defined for software instances and/or service instances that have been cloud provisioned.

"Provisioning" generally relates to a configuring, managing, and providing of software and/or computing services. In the context of a cloud provisioning environment, a cloud provisioning server can configure, provide, and manage software and/or computing services that are allocated to an end user. Software and services are provisioned to end users by providing the end users with instantiations ("instances") of the software and services.

SUMMARY

According to one or more embodiments, a method includes provisioning, by a cloud provisioning server, an instance of a software resource or service for an end user. The provisioning is based on a template for the software resource or service. The template includes, at least, attribute data, and the attribute data is structured according to an action schema. The method also includes storing the action schema in association with the provisioned instance. The attribute data and the action schema determine at least one action of the provisioned instance. The method also includes performing the at least one action of the provisioned instance.

According to one or more embodiments, a computer system includes a memory. The computer system also includes a processor system communicatively coupled to the memory. The processor system is configured to perform a method including provisioning an instance of a software resource or service for an end user. The provisioning is based on a template for the software resource or service. The template includes, at least, attribute data, and the attribute data is structured according to an action schema. The method also includes storing the action schema in association with the provisioned instance. The attribute data and the action schema determine at least one action of the provisioned instance. The method also includes performing the at least one action of the provisioned instance.

According to one or more embodiments, a computer program product including a computer-readable storage medium is provided. The computer-readable storage medium has program instructions embodied therewith. The computer-readable storage medium is not a transitory signal per se, the program instructions readable by a processor system to cause the processor system to perform a method. The method includes provisioning, by a cloud provisioning server, an instance of a software resource or service for an end user. The provisioning is based on a template for the software resource or service. The template includes, at least, attribute data, and the attribute data is structured according to an action schema. The method also includes storing the action schema in association with the provisioned instance. The attribute data and the action schema determine at least one action of the provisioned instance. The method also includes performing the at least one action of the provisioned instance.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
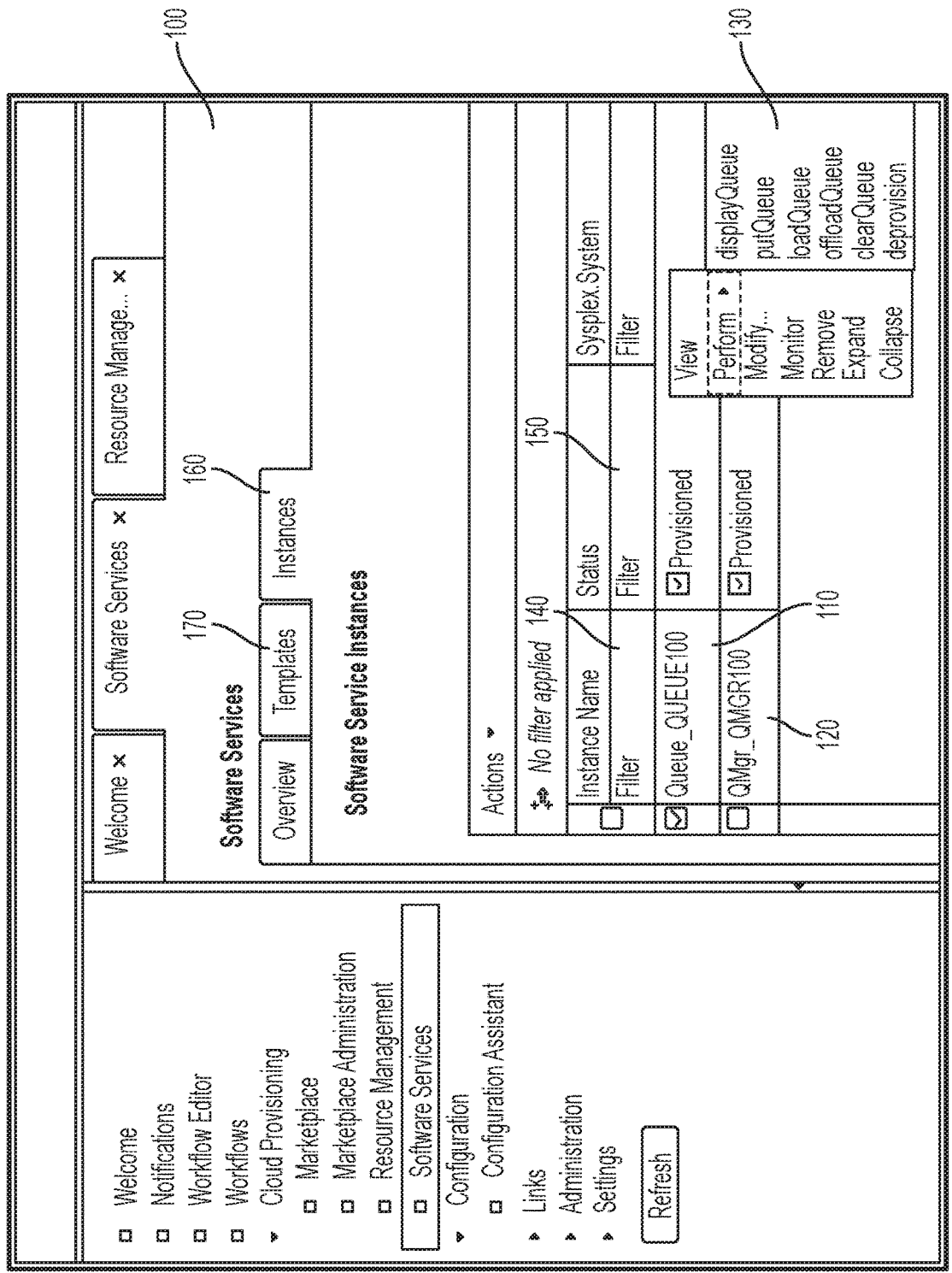
FIG. 1 depicts an interface that displays different provisioned instances, and that displays different actions that can be performed upon those instances, in accordance with one or more embodiments.

In accordance with one or more embodiments, methods and computer program products for performing actions that have been defined for provisioned instances are provided. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

It is also understood in advance that although this disclosure includes a detailed description on cloud computing, implementation of the teachings recited herein are not limited to a cloud computing environment. Rather, one or more embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

As discussed above, "provisioning" generally relates to configuring, managing, and providing of software and/or computing services. A provisioning server can perform the provisioning of the software and/or computing services to an end user. A software instance can be a specific realization of a software application that is run. The end user can run the software instance on the end user's computer, for example. When running the software instance on the end user's computer, the end user can perform different actions upon the software instance. The actions can vary based on the type of the particular software, and the actions can vary based on the intended use of the software. The performable actions can be predefined by a service provider of the software.

One type of provisioning can be the provisioning of middleware software and middleware services. With the previous approaches of deploying and installing middleware software/services, a group of system programmers is typically required to perform the installation of the middleware software/services, due to the specialized experience that is necessary to perform such installation. Further, even after the installation of the middleware software/service is completed, if an end user wants to perform an action with the installed software/service, the user would still need to consult the group of system programmers, in order to determine how to perform the action with the installed software/ service. In general, with the previous approaches, the installing and utilizing of middleware software/services can be inconvenient to the end user, because the previous approaches generally did not provide any listing/registry of installed middleware that is readily viewable by the end user. The previous approaches also generally did not provide a listing of actions that can be performed on the installed middleware.

In view of the difficulties associated with the previous approaches, such as the difficulties in determining which middleware is installed, and the difficulties relating to performing actions on the installed middleware, one or more embodiments can perform (1) displaying of provisioned instances of software/service, and (2) actions that have been defined for the provisioned instances of software/service, as described in more detail below. One or more embodiments can enable end users to perform actions for provisioned instances, without requiring the end users to consult a specialized team of system programmers.

In order to achieve the above-described advantages, one or more embodiments can use different data structures and file formats to organize/manage provisioned instances and their corresponding actions, as described in more detail below. For example, one or more embodiments can provision instances by using templates. A template can generally refer to a file format that includes data for provisioning resources and services. For example, a template can contain a provisioning Extensible Markup Language (XML) document/file, and can also contain an actions XML file. The provisioning XML file can facilitate the provisioning of the software, and the actions XML file can facilitate the performing of actions using the provisioned software. Specifically, the actions XML file can define attributes of actions. The actions can be performed after the software/service is provisioned.

After instances of software and/or services are provisioned, users can then perform actions upon the provisioned instances. What the actions are, and what the actions do, can be defined by the contents of the aforementioned actions XML file (i.e., actions.xml file), for example. An actions.xml can define attributes of one or more actions. Also, an action can be associated with a provisioned instance. For example, a deprovisioning action can remove an instance that was previously provisioned, and other actions can modify features of a particular instance.

The formatting and syntax for an actions.xml file, and for an action itself, can be specified by an action schema. An actions schema is generally considered to be a description that specifies how to define a type of action. Specifically, an action schema can specify the syntax and structure that is used to define a type of action. The action schema can, for example, specify the syntax and structure of an actions.xml file. The action schema for an action can also determine whether a particular provisioned software/service instance can perform the action. The action schema can also be used to validate whether a given actions.xml file properly defines an action.

One or more embodiments can implement an action schema as an action schema file. The following computer code corresponds to example contents of an action schema file (such as, for example, the contents of an XML Schema Definition (XSD) file).

```
<xs:element name="actionList">
<xs:complexType>
<xs:sequence>
<!-- Action element is not optional. -->
<xs:element name="action" type="actionType" minOccurs="1" maxOccurs="50"/>
</xs:sequence>
</xs:complexType>
<xs:unique name="uniqueActionName">
<xs:selector xpath="action" />
<xs:field xpath="@name" />
</xs:unique>
</xs:element>
```

The contents of the above action schema file specify the structure and/or syntax that is used to define an example action. For example, referring to the code shown above, the action schema designates that each definition of an action (as defined by, for example, an actions.xml file) is to have a name that is a unique identifier. The example action schema indicates the need to have a name that is a unique identifier with the code <xs:unique name="uniqueActionName">, for example.

Further, the example action schema designates that each action can designate a number of occurrences that can be performed. The number of occurrences can correspond to the number of times the defined action can be performed, for example. The above example action schema indicates that a minimum number of occurrences is "1," and a maximum number of occurrences is "50," as reflected by "minOccurs" and "maxOccurs" shown above.

The code within an actions schema file can also specify that each definition of an action is to define what the action performs. The following code corresponds to additional example contents of the same action schema file.

```
<xs:complexType name="actionType">
<xs:sequence>
<!-- List of action types. -->
<xs:choice>
```

-continued

```
<xs:element name="command" type="actionCommandType" />
<xs:element name="workflow" type="actionWorkflowType">
<xs:unique name="uniqueWfVarName">
<xs:selector xpath="wfVar" />
<xs:field xpath="@name" />
</xs:unique>
</xs:element>
<xs:element name="instructions" type="velocityNonNullString" />
</xs:choice>
</xs:sequence>
<!-- Action name attribute is not optional. -->
<xs:attribute name="name" type="actionNameType" use="required" />
</xs:complexType>
```

Referring to the example code above, possible types of performance to be performed by the action include, for example, running system commands, running workflows, running manual instructions, and/or prompting the end user. With the code <xs:element name="command" type="actionCommandType"/>, the example action schema specifies that the action needs to have a defined performance.

In addition to having a defined unique identifier and a defined performance, each action can have additional defined attributes. For example, an action can be configured to request a value. The action can cause a value to be obtained by a provisioned instance, or the action can request a value to be entered by the end user at run time, as described in more detail below.

When a software resource/service is to be provisioned, one or more embodiments perform the provisioning in accordance with a template of the particular software resource/service. As described above, the template can include attribute data that is used to define an action of the provisioned instance. For example, the template can include an actions.xml file that is used to define an action of the provisioned instance, and the attribute data of the template can be structured in accordance with an action schema, as described above.

When the instance of the software resource/service is provisioned, the action schema for the provisioned instance can be stored in association with the provisioned instance. For example, one or more embodiments can store an action schema within a JavaScript Object Notation (JSON) data store, where the JSON data store is stored in association with the provisioned instance. The JSON data store can be stored on the provisioning server or on the end-user's computing device/server.

Because the action schema is stored in association with the provisioned instance, when actions are to be run on the provisioned instance, one or more embodiments can refer to the stored actions schema in order to run the actions. The action structure/syntax specified by the stored actions schema can be used in conjunction with the action attributes defined in the template (such as defined within the actions.xml file of a template, for example) to determine the actions that the end user can perform. Therefore, the stored action schema can be used to facilitate performing of actions on the provisioned instance.

In order to allow the end user to readily ascertain the instances that have been provisioned and the actions that can be performed, one or more embodiments can generate a user interface that displays the list of provisioned instances and the actions that can be performed. The user interface can also appropriately prompt the user to provide inputs, as described in more detail below.

FIG. 1 depicts an interface 100 that displays different provisioned instances (110, 120), and displays different actions 130 that can be performed upon those instances (110, 120), in accordance with one or more embodiments. As described above, a provisioning server can generate interface 100 to be displayed to the end user, for example. In other embodiments, interface 100 can be generated by a server/computing device of the end user. The list of instances can be displayed upon accessing "Instances" tab 160. As described above, one or more embodiments can provide a list/registry of different instance names 140, and one or more embodiments can provide the status 150 of each instance. For example, as shown by interface 100, instance "Queue_QUEUE100" has a "provisioned" status, and actions 130 can be performed on instance "Queue_QUEUE100." Actions 130 include actions such as "displayQUEUE," "putQUEUE," "loadQUEUE," "offloadQUEUE, " "clearQueue," and "deprovision," for example. The list of performable actions can be determined based upon the action attributes (defined in an actions.xml file, for example), in conjunction with the syntax/structure defined by the stored action schema. Information regarding different templates that have been used in provisioning the instance can be displayed upon accessing "Templates" tab 170.

Figure 2:
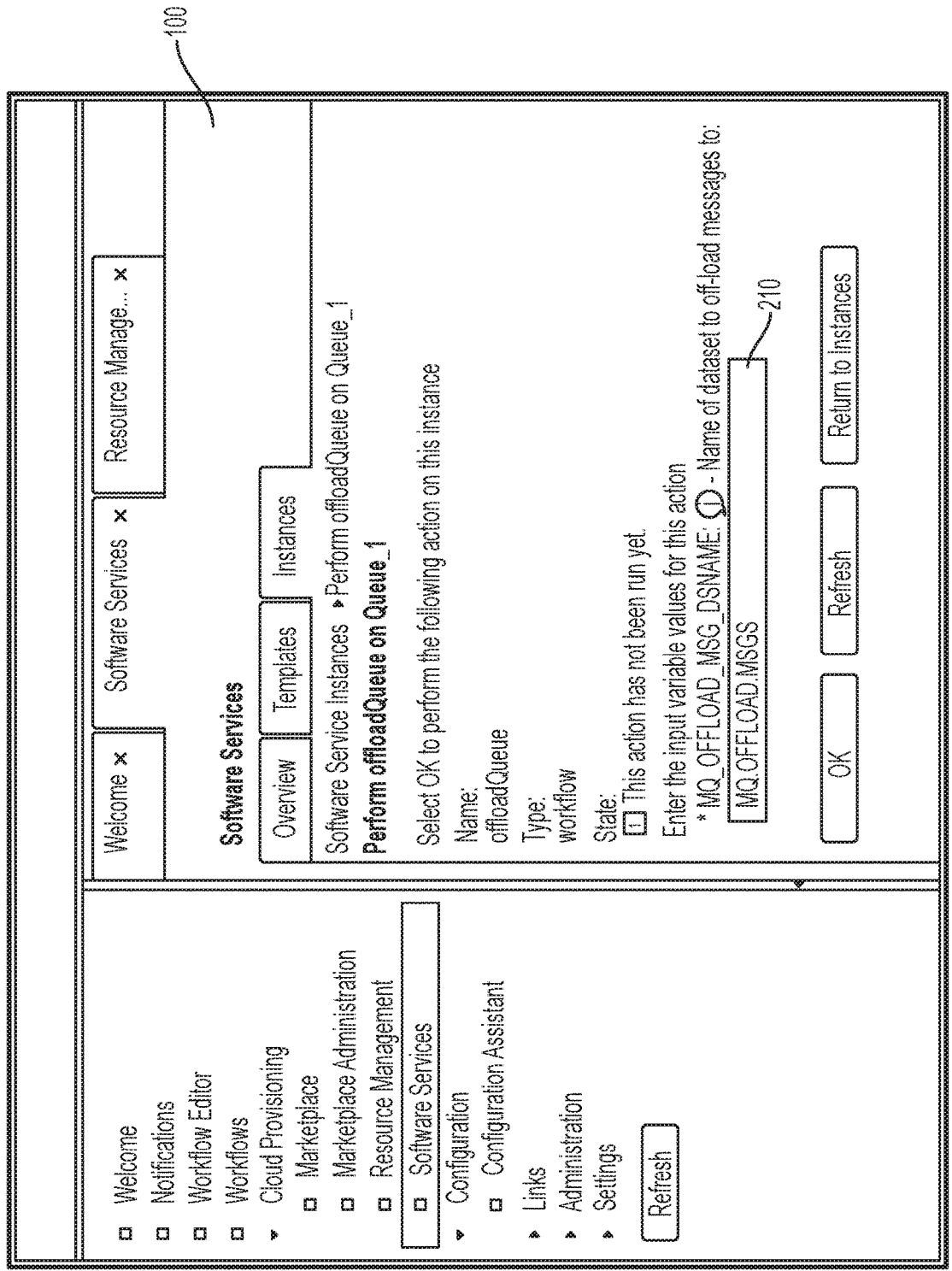
FIG. 2 depicts an interface that requests input from an end user, in accordance with one or more embodiments.

When the end user attempts to perform an action, one or more embodiments can request additional input, if necessary. FIG. 2 depicts an interface 100 that requests input from an end user, in accordance with one or more embodiments. In the example of FIG. 2, action "offloadQueue" is being performed by the end user. Interface 100 indicates that the action is a "workflow" type of action, and the state of the action "has not been run yet." In order to run action "offloadQueue," the end user is prompted to enter variable values for this action, where the user is prompted to enter the variable values into input box 210. In the example of FIG. 2, the user has entered variable value "MQ.OFFLOAD.MSGS" in input box 210. Actions can cause values to be obtained by provisioned instances. Further, actions can request values to be input by the user (before or during the running of the action).

Figure 3:
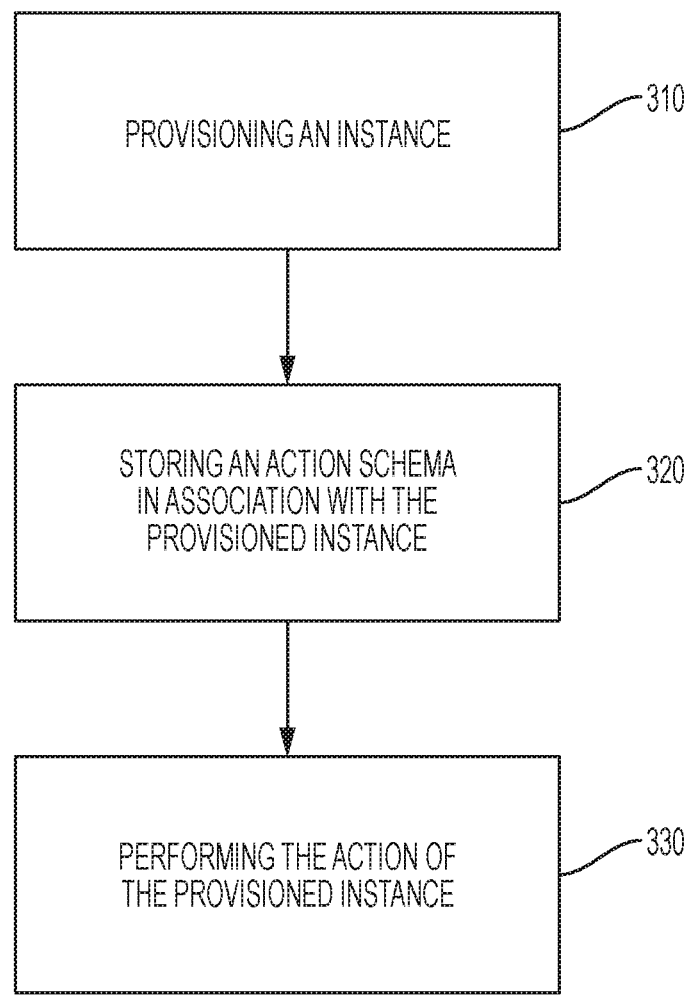
FIG. 3 depicts a flowchart of a method in accordance with one or more embodiments.

FIG. 3 depicts a flowchart of a method in accordance with one or more embodiments. The method can be performed by a provisioning server, for example. In another embodiment, the method can be performed by a server or computing device of the end user, for example. The method includes, at block 310, provisioning, by a cloud provisioning server, an instance of a software resource or service for an end user. The provisioning is based on a template for the software resource or service. The template includes attribute data, and the attribute data is structured according to an action schema. The method includes, at block 320, storing the action schema in association with the provisioned instance.

The attribute data and the action schema determine at least one action of the provisioned instance. The method includes, at block 330, performing the at least one action of the provisioned instance.

In view of the above, one or more embodiments are directed to a framework that can perform orchestration of actions of provisioned applications. These actions can potentially be complex actions, which previously required consultation with system programmers in order to be run. One or more embodiments can perform orchestration by using action schemas.

Figure 4:
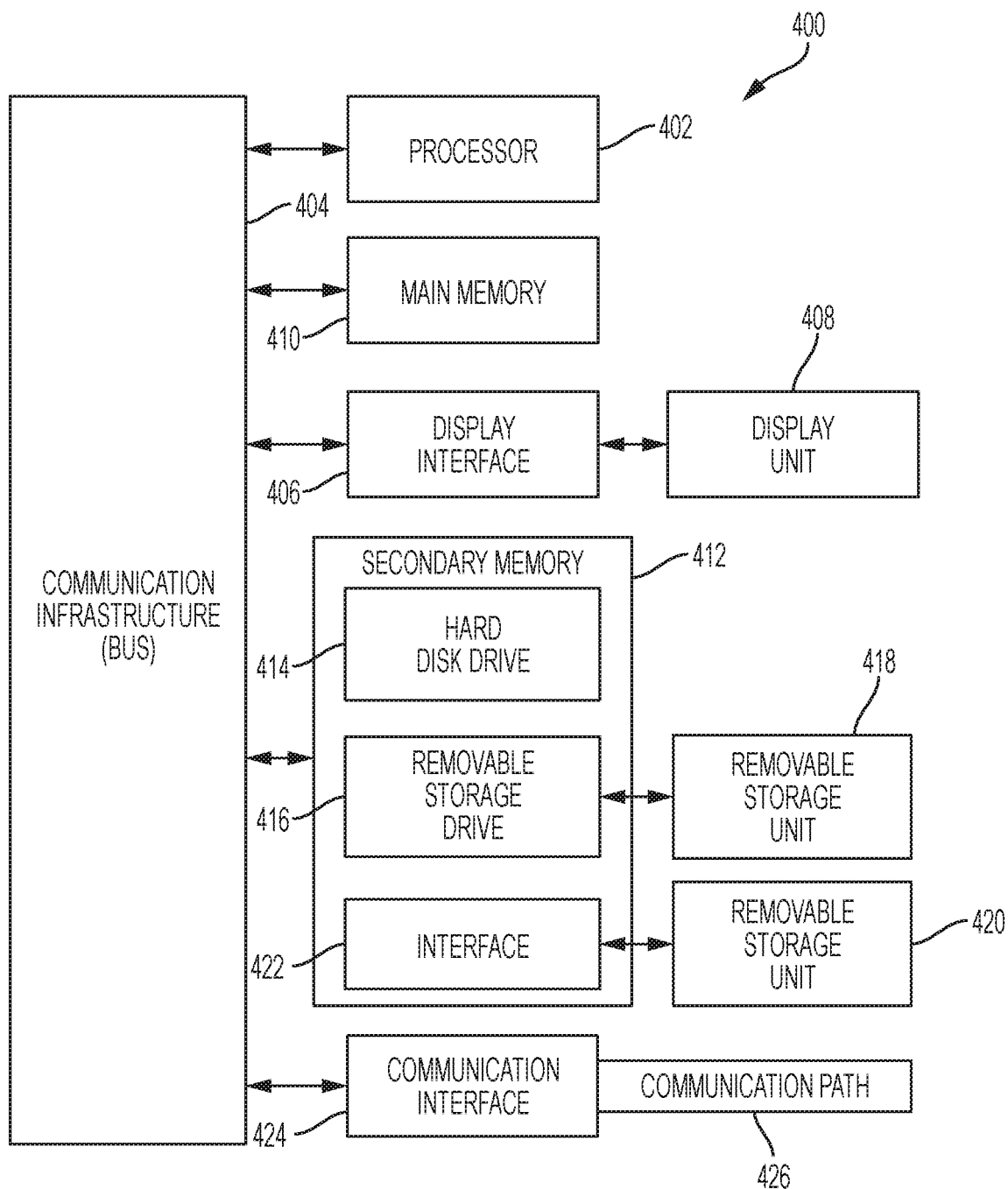
FIG. 4 depicts a high-level block diagram of a computer system, which can be used to implement one or more embodiments.

FIG. 4 depicts a high-level block diagram of a computer system 400, which can be used to implement one or more embodiments. Computer system 400 can correspond to, at least, a provisioning server, a server of the end user, and/or a computing device of the end user. Computer system 400 can be used to implement hardware components of systems capable of performing methods described herein. Although one exemplary computer system 400 is shown, computer system 400 includes a communication path 426, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and can also include a secondary memory 412. Secondary memory 412 can include, for example, a hard disk drive 414 and/or a removable storage drive 416, representing, for example, a floppy disk drive, a magnetic tape drive, or an optical disc drive. Hard disk drive 414 can be in the form of a solid state drive (SSD), a traditional magnetic disk drive, or a hybrid of the two. There also can be more than one hard disk drive 414 contained within secondary memory 412. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disc, etc. which is read by and written to by removable storage drive 416. As will be appreciated, removable storage unit 418 includes a computer-readable medium having stored therein computer software and/or data.

In alternative embodiments, secondary memory 412 can include other similar means for allowing computer programs or other instructions to be loaded into the computer system. Such means can include, for example, a removable storage unit 420 and an interface 422. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 420 and interfaces 422 which allow software and data to be transferred from the removable storage unit 420 to computer system 400.

Computer system 400 can also include a communications interface 424. Communications interface 424 allows software and data to be transferred between the computer system and external devices. Examples of communications interface 424 can include a modem, a network interface (such as an Ethernet card), a communications port, or a PC card slot and card, a universal serial bus port (USB), and the like. Software and data transferred via communications interface 424 are in the form of signals that can be, for example, electronic, electromagnetic, optical, or other signals capable of being received by communications interface 424. These signals are provided to communications interface 424 via communication path (i.e., channel) 426. Communication path 426 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 410 and secondary memory 412, removable storage drive 416, and a hard disk installed in hard disk drive 414. Computer programs (also called computer control logic) are stored in main memory 410 and/or secondary memory 412. Computer programs also can be received via communications interface 424. Such computer programs, when run, enable the computer system to perform the features discussed herein. In particular, the computer programs, when run, enable processor 402 to perform the features of the computer system. Accordingly, such computer programs represent controllers of the computer system. Thus it can be seen from the forgoing detailed description that one or more embodiments provide technical benefits and advantages.

Figure 5:
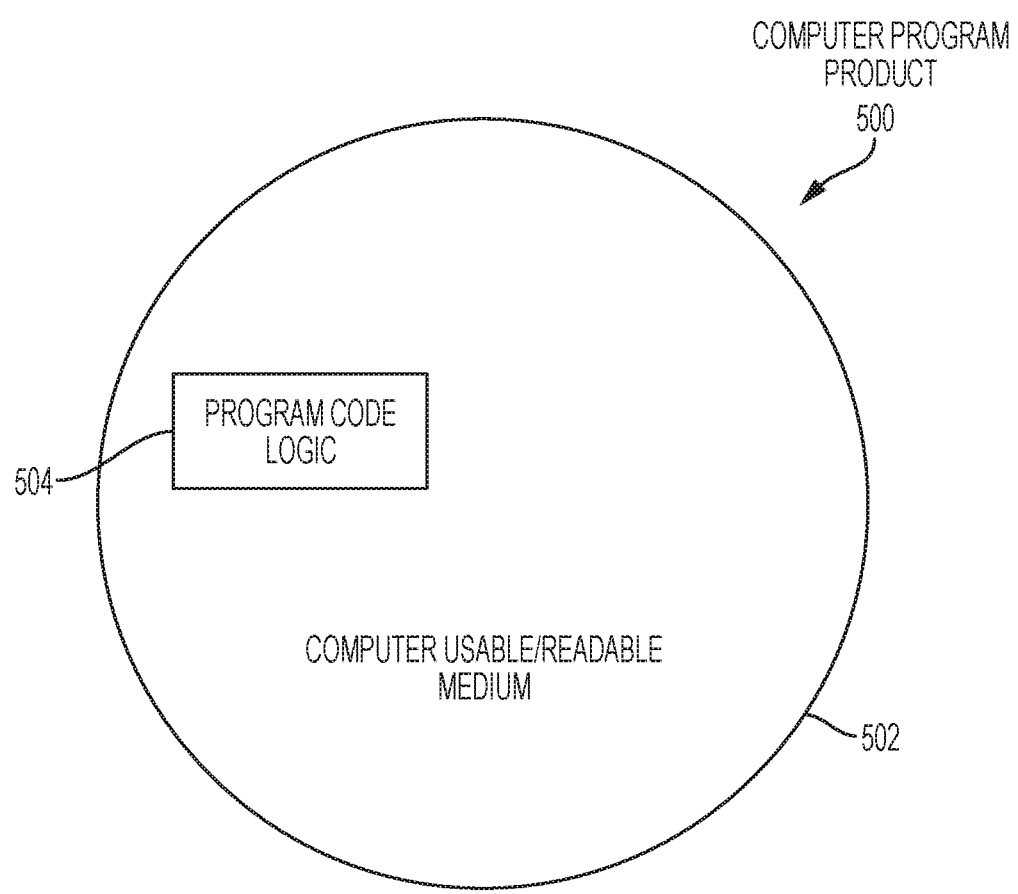
FIG. 5 depicts a computer program product, in accordance with one or more embodiments.

FIG. 5 depicts a computer program product 500, in accordance with an embodiment. Computer program product 500 includes a computer-readable storage medium 502 and program instructions 504.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
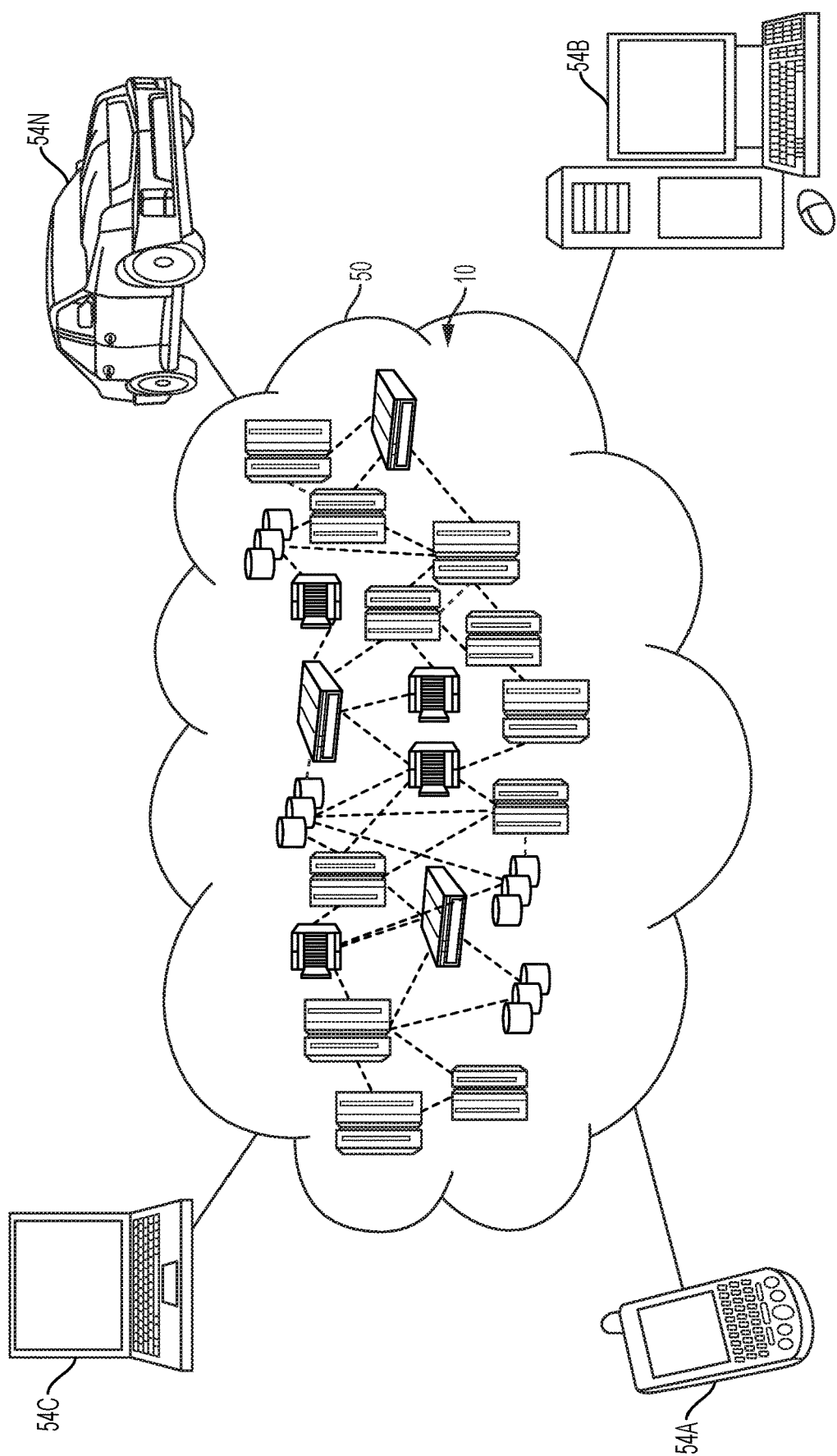
FIG. 6 depicts a cloud computing environment according to an embodiment.

FIG. 6 depicts a cloud computing environment according to an embodiment. Referring FIG. 6, illustrative cloud computing environment 50 is depicted. As described above, one or more embodiments can be implemented within a cloud computing environment. A system (such as a provisioning server, for example) that performs the method of FIG. 3 can also be implemented within a cloud computing environment, for example. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 6 are intended to be illustrative only and that computing nodes 10 and cloud computing environment 50 can communicate with any type of computerized device over any type of network and/or network addressable connection (e.g., using a web browser).

Figure 7:
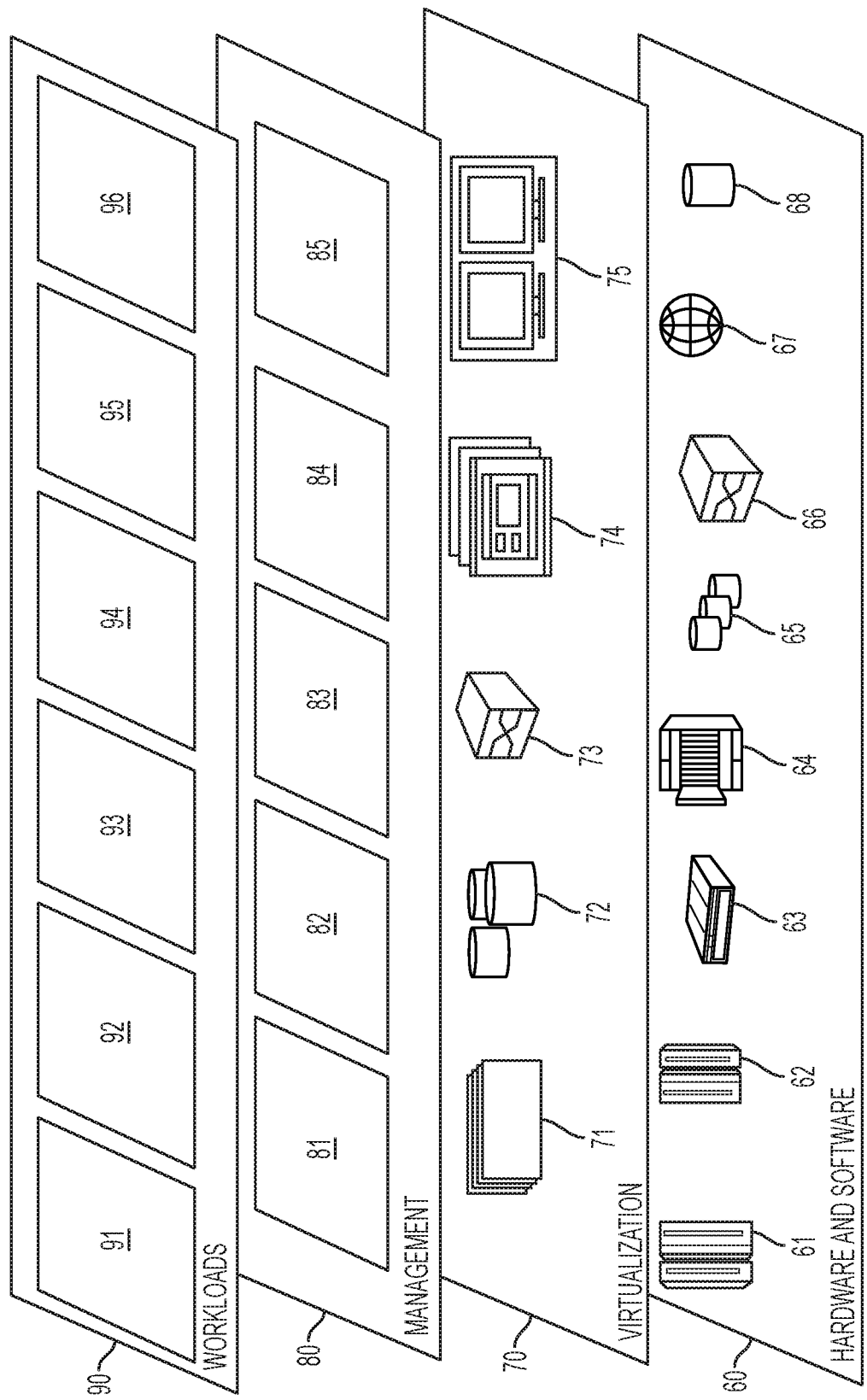
FIG. 7 depicts abstraction model layers according to an embodiment.

FIG. 7 depicts abstraction model layers according to an embodiment. Referring to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and instance provisioning 96.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method, the method comprising:
   provisioning, by a cloud provisioning server, an instance of a software resource or service for an end user, wherein the provisioning is based on a template for the software resource or service, the template comprises attribute data, and the attribute data is structured according to an action schema, wherein the template comprises attribute data that defines the at least one action and wherein the attribute data that defines the at least one action corresponds to an actions.xml file;
   storing the action schema in association with the provisioned instance, wherein the attribute data and the action schema determine at least one action of the provisioned instance; and
   performing the at least one action of the provisioned instance.

2. The computer-implemented method of claim 1 further comprising presenting the provisioned instance within a list of other provisioned instances.

3. The computer-implemented method of claim 1 further comprising presenting the at least one action of the provisioned instance within a list of other actions of the provisioned instance.

4. The computer-implemented method of claim 1, wherein the action schema defines a syntax of the attribute data of the template.

5. The computer-implemented method of claim 1, wherein storing the action schema comprises storing the action schema in a JavaScript Object Notation data store.

6. A computer system comprising:
   a memory; and
   a processor system communicatively coupled to the memory;
   the processor system configured to perform a method comprising:
      provisioning an instance of a software resource or service for an end user, wherein the provisioning is based on a template for the software resource or service, the template comprises attribute data, and the attribute data is structured according to an action schema, wherein the template comprises attribute data that defines the at least one action and wherein the attribute data that defines the at least one action corresponds to an actions.xml file;
      storing the action schema in association with the provisioned instance, wherein the attribute data and the action schema determine at least one action of the provisioned instance; and
      performing the at least one action of the provisioned instance.

7. The computer system of claim 6, wherein the method further comprises presenting the provisioned instance within a list of other provisioned instances.

8. The computer system of claim 6, wherein the method further comprises presenting the at least one action of the provisioned instance within a list of other actions of the provisioned instance.

9. The computer system of claim 6, wherein the action schema defines a syntax of the attribute data of the template.

10. The computer system of claim 6, wherein storing the action schema comprises storing the action schema in a JavaScript Object Notation data store.

11. A computer program product comprising:
   a computer-readable storage medium having program instructions embodied therewith, wherein the computer-readable storage medium is not a transitory signal per se, the program instructions readable by a processor system to cause the processor system to perform a method comprising:
   provisioning, by a cloud provisioning server, an instance of a software resource or service for an end user, wherein the provisioning is based on a template for the software resource or service, the template comprises attribute data, and the attribute data is structured according to an action schema, wherein the template comprises attribute data that defines the at least one action and wherein the attribute data that defines the at least one action corresponds to an actions.xml file;

storing the action schema in association with the provisioned instance, wherein the attribute data and the action schema determine at least one action of the provisioned instance; and performing the at least one action of the provisioned instance.

12. The computer program product of claim 11, wherein the method further comprises presenting the provisioned instance within a list of other provisioned instances.

13. The computer program product of claim 11, wherein the action schema defines a syntax of the attribute data of the template.

14. The computer program product of claim 11, wherein storing the action schema comprises storing the action schema in a JavaScript Object Notation data store.

* * * * *